July 9, 1963  S. ÅKE G. SVENSSON  3,096,784
AUTOMATIC SHUT-OFF DEVICE
Filed May 16, 1962
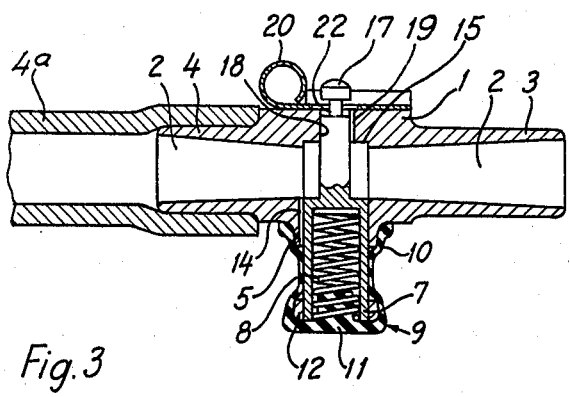
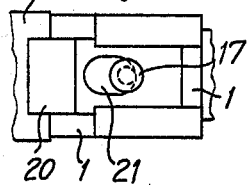
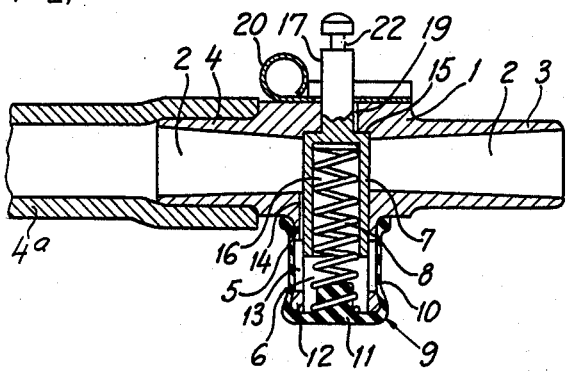
INVENTOR.
Stig Åke Gösta Svensson
BY
Davis, Hoxie, Faithfull & Hapgood
attorneys United States Patent Office 3,096,784
Patented July 9, 1963

3,096,784
AUTOMATIC SHUT-OFF DEVICE
Stig Åke Gösta Svensson, Sodertalje, Sweden, assignor to Aktiebolaget Separator, Stockholm, Sweden, a corporation of Sweden
Filed May 16, 1962, Ser. No. 195,258
Claims priority, application Sweden May 26, 1961
13 Claims. (Cl. 137—463)

This invention relates to shut-off devices or valves of the automatic type and more particularly to an improved device of this type which is especially useful in vacuum milking systems.

Vessels and pipe lines intended for a pressure differing from the ambient pressure are often provided with safety valves, which prevent the pressure difference from dropping below a predetermined value. This is the case for instance, in milking machines operable by vacuum. In such machines the so-called teat cup is held in position on the teat of the cow by means of a suction effect, so that a certain pressure difference must always exist between the atmospheric pressure and the pressure in the chamber which surrounds the teat, in order that the teat cup will remain hanging on the teat. A certain degree of sealing is therefore required between teat and teat cup so that the outside air cannot penetrate between them and reduce the pressure difference to such a value that the teat cup can slip off the teat. In spite of a careful fitting of the teat cup to the teat, it nevertheless occurs in practice that the teat cup is imperfectly fitted and therefore slips off the teat. This can also occur owing to the fact that the cow itself, by moving, coughing, kicking or the like, causes the teat cup to slip off the teat. If that occurs, dirt may be sucked with the air into the teat cup which has slipped off and thus be conveyed into the milk pail and contaminate the milk. A slipped-off teat cup also presents other detrimental effects. The air sucked in through the teat cup which has slipped off reduces the partial vacuum in the teat cups of the same set of teat cups, thus affecting their milking efficiency ar even causing them to slip off their corresponding teats. If, in a machine milking system, several sets of teat cups are connected to a common milk pipe line under vacuum, the slipping off of a single teat cup in a set of teat cups can have the result that all sets of teat cups slip off their teats or, if they do not slip off, that their milking efficiency will in any case be reduced owing to the reduced suction effect.

Thus, in the above-mentioned example it is important, should one or several teat cups slip off the teats, that the resulting detrimental effects be rapidly neutralized. This can be accomplished by positioning an automatic cut-off valve, as disclosed in U.S. Patent No. 1,545,645, in the milk pipe line connecting the teat cup to the remaining parts of the milking system, which valve shuts off the communication between the teat cup and said remaining parts as soon as outside air flows into the communication and the difference between the pressure of the outside air and the pressure inside the communication drops below a predetermined value. Thus, only the teat cup which has slipped off is put out of operation while the remaining teat cups operate normally. Since the four teat cups in a set of teat cups are generally connected to a common milk claw which communicates in turn with the rest of the milking system by a single pipe line, the automatic cut-off valve is preferably positioned in the latter pipe line, whereby the valve cuts off the whole set of teat cups and only one cut-off valve is required for each set of teat cups, instead of four. According to Swedish Patent No. 133,288, the cut-off valve can be located in the milk claw.

However, the cut-off valves of the above-mentioned patents are not satisfactory. The valve according to the first patent takes up much space, and the valve according to the second patent does not work satisfactorily since it is either too sensitive and shuts off too early due to milk impulses or not sensitive enough and shuts off too late or not at all.

The present invention (which is not restricted to use in connection with milking machine units) has for its principal object the provision of a cut-off device which operates automatically, does not take up much space and is reliable in that it is kept open at pressure differences exceeding a predetermined value while being unresponsive to pressure impulses from the medium which flows through the pipe line under control and which has a lower pressure than the ambient pressure, in that it shuts off as soon as the pressure difference is below the predetermined value.

An automatically operable cut-off device made according to the invention comprises a casing having a suction duct extending therethrough and a channel crossing the suction duct and receiving a piston which is movable between two end positions in the channel. In one of its end positions the piston shuts off the suction duct and in its other end position it keeps the suction duct open. A biasing element urges the piston towards one of its end positions against the action of a friction locking device which grips the piston with a force dependent upon the difference between the ambient pressure and the pressure in the suction duct. This locking device comprises an easily flexible membrane covering an opening in the wall of the channel in which the piston travels, which membrane, under the action of the external pressure, is pressed through the opening and against the piston so as to lock it against movement by the biasing element when the difference between the pressures on the opposite sides of the membrane is equal or superior to a predetermined value, the membrane releasing the piston when the pressure difference is below the predetermined value.

Owing to the fact that the channel for the piston crosses the suction duct, the stroke of the piston outside the suction duct can be very short; and since the channel for the piston may cross the suction duct from any direction, the valve takes up very little space and can be adapted easily to any kind of suction pipe line. In addition, the piston is insensitive to impulses from the medium flowing in the suction pipe line, owing to the fact that the stroke of the piston crosses the flow direction of the medium. Furthermore, since the locking device is constituted by an easily flexible membrane covering an opening in the wall of the piston channel, the locking device contributes substantially to the fact that the dimension of the cut-off device can be kept very small and to a high sensitivity of the locking device to the pressure difference.

According to one embodiment of the invention, the piston channel is arranged at least partially in a protrusion of the casing, the wall of which protrusion is provided with several openings covered by a membrane in the form of a sleeve surrounding the protrusion, whereby the piston is locked in several places by the membrane. The channel for the piston may be arranged to open through the end surface of the protrusion of the casing; and the sleeve may have the shape of a cap which is drawn on the protrusion and forms a bottom of the piston channel, whereby the piston can be easily assembled and disassembled for cleansing, and the design is simple and cheap. The bottom of the cap preferably has a thickness such that it constitutes a firm wall for the piston when the cap is drawn on the protrusion of the casing, where the cap may be maintained by a radially projecting, ring-shaped flange at the free end of the protrusion of the casing.

The clearance between the piston and the piston channel provides a communication between the suction duct and the opening for the membrane in the piston channel. This clearance is sufficient for effecting the pressure difference between the outside atmospheric pressure and the pressure prevailing in the suction duct and thus in the piston channel, which pressure difference is to actuate the membrane. The clearance or communication can be enlarged by providing a groove in the inner wall of the piston channel or in the piston. Such a groove is preferably located on that side of the piston which is shut off from the suction source of the suction duct when the piston has obturated the suction duct, because in this way disinfectant is prevented from leaking out when the milking system is filled with disinfectant under pressure while the valve is shut off.

In order to provide a valve which is as small as possible, it is preferable that the biasing element which is to actuate the piston be constituted by a spring fitted in a recess at one end of the piston and that this spring rest against the bottom of the cap.

To bring the piston from a shut-off position to a position within reach of the locking action of the membrane, it is necessary that the piston be manually actuatable against the action of the biasing element. For this purpose the piston is preferably provided with a stem on that end which is opposite to the end on which the membrane operates, which stem extends through a corresponding opening in the casing.

In order to allow flushing of the milking system in which the cut-off device is used without requiring disassembly when the suction source is disconnected, it is preferable to provide the piston with a manually controlled locking member for locking it in a position ensuring an open suction duct. Such a locking member may consist of a bolt slidably arranged on the casing and movable into and out of a recess in the piston stem.

When the cut-off device of the invention is used to close the communication between the teat cups and the remaining part of the milking system, it is preferable to provide a groove in one of the contact surfaces between the piston stem and the recess in the casing for the stem. This groove connects the suction duct with the outside atmosphere when the piston is in its open position in relation to the suction duct, but shuts off or interrupts this communication when the piston is in its closed position in relation to the suction duct. With this arrangement, a small quantity of air enters the suction duct during the milking process, which influx of air avoids so-called teat washing wherein the milk remains around the teat and, under the effect of the pulsations, washes it by flowing of milk alternately in both directions along the teat. Owing to the influx of air in the groove, the milk column leaves the teat at each pulsation so that no teat-wash can occur.

For a better understanding of the invention, reference may be had to the accompanying drawing, in which FIG. 1 is a vertical sectional view of a preferred form of the new cut-off device, showing the valve in its opening position;

FIG. 2 is a view similar to FIG. 1 but showing the valve in its closed position, and FIG. 3 is a plan view of part of the device shown in FIGS. 1 and 2.

The device as illustrated comprises a casing 1 having a suction duct 2 extending lengthwise through the casing. The ends of duct 2 open through nipples 3 and 4 of the casing, these nipples being adapted for connection to hoses (not shown). The casing is provided with a protrusion 5 having a bore 6 for a piston 7. The bore 6 is open at the free end of the protrusion 5 and forms a channel for the piston which crosses the suction duct 2 at right angles. The piston can move forward and backward in the channel against the action of a biasing element in the form of a compression spring 8 which urges the piston against the end position shown in FIG. 2, in which position the piston has closed the communication between the ends of the suction duct 2. A resilient rubber cap 9, having a thin-walled, sleeve-like part 10 and a thick-walled bottom part 11, surrounds the protrusion 5 of the casing. The free end of the protrusion 5 is provided with a radially projecting, annular flange 12 which retains the cap 9 with its bottom part 11 pressed against the free end of the protrusion, so that the bottom part forms a firm wall or stop for the piston in the channel 6. The mantle of the protrusion 5 has circumferentially spaced openings 13. Thus, when the suction duct 2 is subjected to a vacuum, the sleeve 10 is forced by the atmospheric pressure into frictional locking contact with the piston and retains the piston in its open position in relation to the suction duct (that is, adjacent the bottom 11) against the action of the spring 8.

The pressure difference between the atmospheric pressure and the pressure prevailing in the suction duct 2 is utilized to press the sleeve or membrane 10 against the piston 7 and retain the piston in its open position (FIG. 1). This requires that the suction duct be in communication with the opening 13, which communication is generally provided by the clearance between the piston and the piston channel; but if this clearance is too small, a groove 14 can be provided in the channel wall. When the piston is in closed position, it rests against a stop 15 in the casing. The spring 8 is fitted in a bore 16 in the piston.

The piston 7 is provided with a stud 17 which extends through a corresponding bore 18 in the casing. The wall of the bore 18 is provided with a groove 19, through which a small quantity of atmospheric air can be admitted to the suction duct when the piston is in open position, but which groove is shut off by the piston when the latter moves into closed position. The piston can be moved to its open or bottom position by manual pressure exerted on the stud 17 against the action of the spring 8, whereupon the piston will be automatically locked in this position, the partial vacuum in the suction duct 2 is sufficient. If, for any reason, the partial vacuum in the suction duct drops below a predetermined value, the reduced pressure of cap wall 10 against piston 7 allows the spring 8 to move the piston rapidly to its closed position.

A locking member in the form of a bolt 20 is provided with a hole 21 which is slightly larger than the cross-section of the stud 17. Bolt 20 is mounted on the casing for sliding movement between two positions, in one of which the edge of the hole in the bolt is engaged with a ring-shaped groove 22 in the stud to lock the piston in its open position (FIG. 1). In its other position the bolt 20 has no influence on the stud 17.

If the cut-off device is to be used in a milking system, the nipple 4 is connected to the milk hose 4a from a teat cup or to the milk hose from the milk claw with its four teat-cups, and the nipple 3 is connected to a vacuum pipe line (not shown) which leads to the milk receptacle.

As an alternative, the casing 1 can be made in one piece with the casing of the above-mentioned milk claw.

The cut-off device according to the invention, when used in connection with machine milking, has the advantage that if the cut-off device falls to the ground, there is no risk that the valve can be jarred to its open position.

I claim:

1. An automatically operable cut-off device comprising a casing having a suction duct extending therethrough, the casing also having a channel crossing the suction duct, a piston slidable in the channel between two end positions in one of which the piston closes the suction duct and in the other of which the piston opens said duct, a biasing element urging the piston to its duct-closing position, said channel communicating with the suction duct and having a lateral opening, and a flexible membrane covering said opening and subjected on its outer surface to atmospheric pressure and on its inner surface to a pressure corresponding to that in the suction duct, the membrane being operable through said opening to engage and lock the piston in its duct-opening position against the action of said biasing element when the duct pressure is below a predetermined value, the membrane being operable to release the piston when the duct pressure rises above said predetermined value.

2. A device according to claim 1, in which the casing has a protrusion forming at least part of said channel and in which said lateral opening is located, said membrane being a sleeve surrounding the protrusion.

3. A device according to claim 1, in which the casing has a protrusion forming at least part of said channel and in which said lateral opening is located, said membrane being a sleeve surrounding the protrusion, said channel opening through the outer end of the protrusion, the sleeve having an end closing the outer end of the protrusion and channel.

4. A device according to claim 1, in which the casing has a protrusion forming at least part of said channel and in which said lateral opening is located, said membrane being a sleeve surrounding the protrusion, said channel opening through the outer end of the protrusion, the sleeve having an end closing the outer end of the protrusion and channel, said end of the sleeve being thicker than the part of the sleeve surrounding the protrusion.

5. A device according to claim 1, in which the casing has a protrusion forming at least part of said channel and in which said lateral opening is located, said membrane being a sleeve surrounding the protrusion, said channel opening through the outer end of the protrusion, the sleeve having an end closing the outer end of the protrusion and channel, the protrusion having at its outer end a radially projecting annular flange securing the sleeve to the protrusion with said end of the sleeve pressed against the outer end of the protrusion.

6. A device according to claim 1, in which the channel has a generally longitudinal groove affording communication between the suction duct and said lateral opening.

7. A device according to claim 1, in which the channel has a generally longitudinal groove affording communication between the suction duct and said lateral opening, said groove being located on that side of the piston which is shut off from the outlet end of the suction duct when the piston is in its duct-closing position.

8. A device according to claim 1, in which said biasing element is a spring.

9. A device according to claim 1, in which the casing has a protrusion forming at least part of said channel and in which said lateral opening is located, said membrane being a sleeve surrounding the protrusion, said channel opening through the outer end of the protrusion, the sleeve having an end closing the outer end of the protrusion and channel, the biasing element being a spring seated on said sleeve end.

10. A device according to claim 1, comprising also a stud on the piston projecting from the casing and operable manually to displace the piston to its duct-opening position against the action of said biasing element.

11. A device according to claim 1, comprising also a locking member movably mounted on the casing for releasably locking the piston in its duct-opening position independently of said membrane.

12. A device according to claim 1, comprising also a locking member movably mounted on the casing for releasably locking the piston in its duct-opening position independently of said membrane, the piston having a stud projecting from the casing and operable manually to displace the piston to its duct-opening position against the action of said biasing element, said stud having a recess, the locking member being a bolt engageable in said recess.

13. A device according to claim 1, comprising also a stud on the piston projecting from the casing and operable manually to displace the piston to its duct-opening position against the action of said biasing element, there being an air vent passage leading to the suction duct and which is closed by the piston in its duct-closing position.

References Cited in the file of this patent
UNITED STATES PATENTS
3,014,455    Olander _____ Dec. 26, 1961